June 30, 1931.    A. B. CADMAN ET AL    1,812,683
MOMENTUM ACTUATED BRAKE
Filed June 2, 1927    2 Sheets-Sheet 1
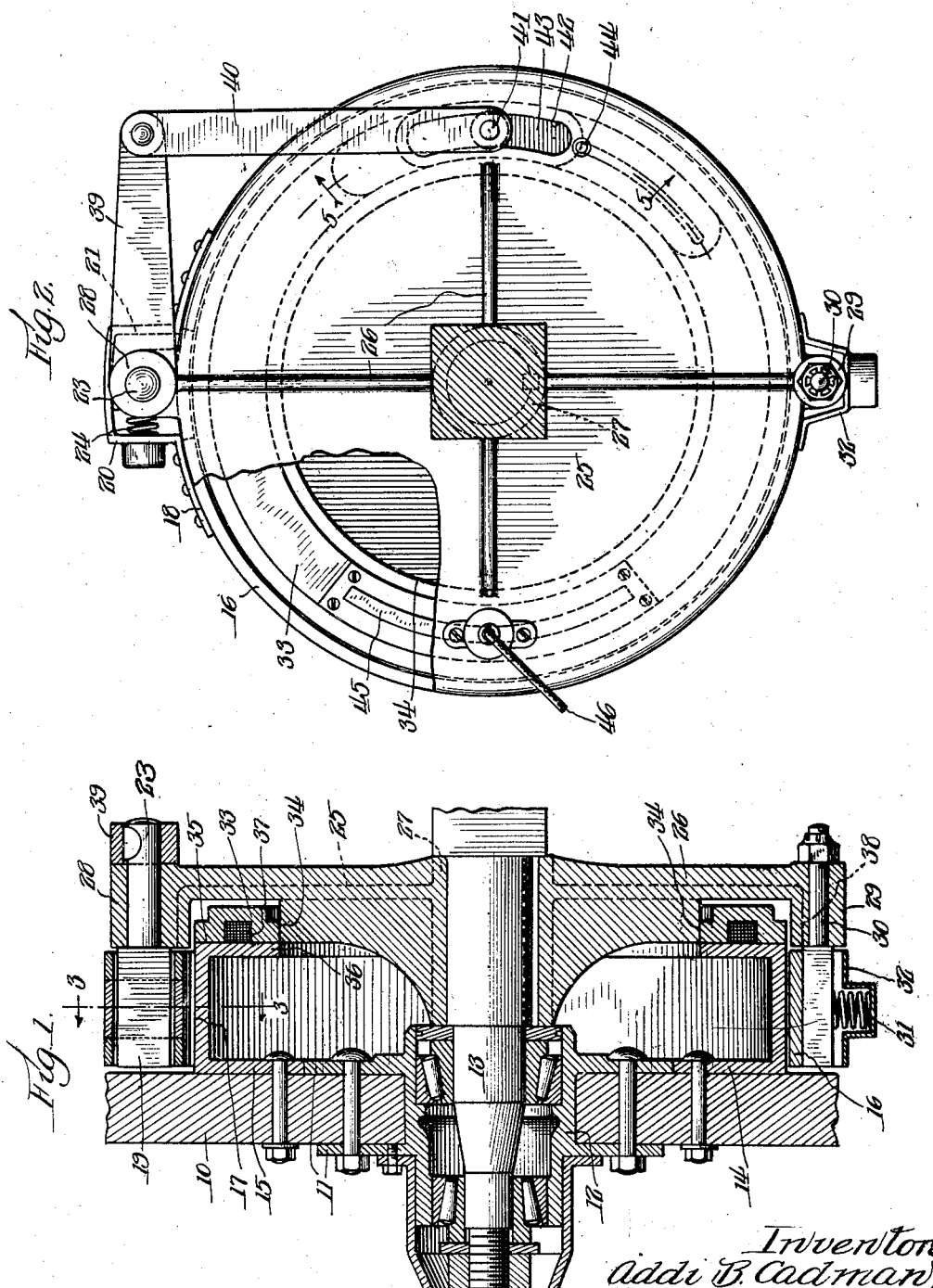
Inventors
Addi B. Cadman,
Albert C. Warner,
By Lindal, Parker & Carlson
Attys.

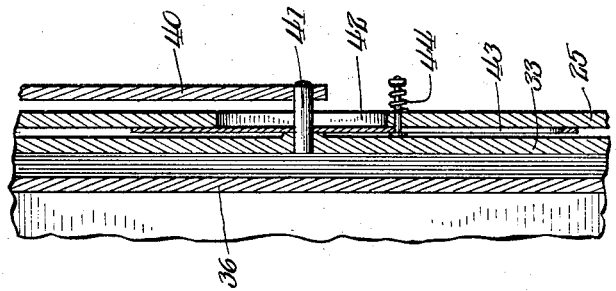
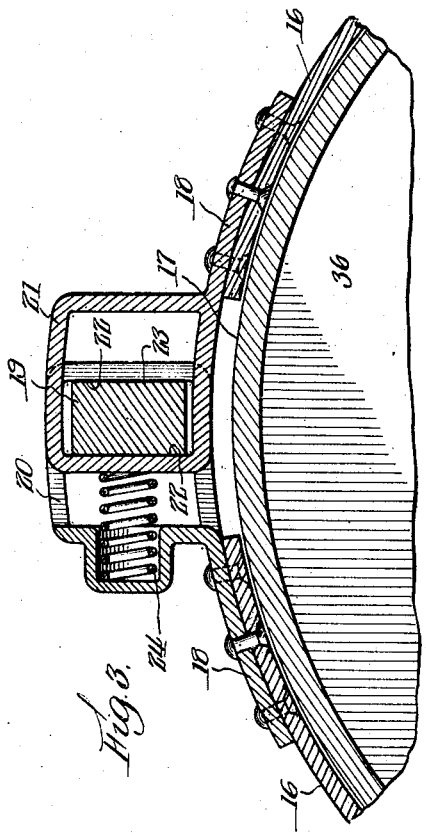
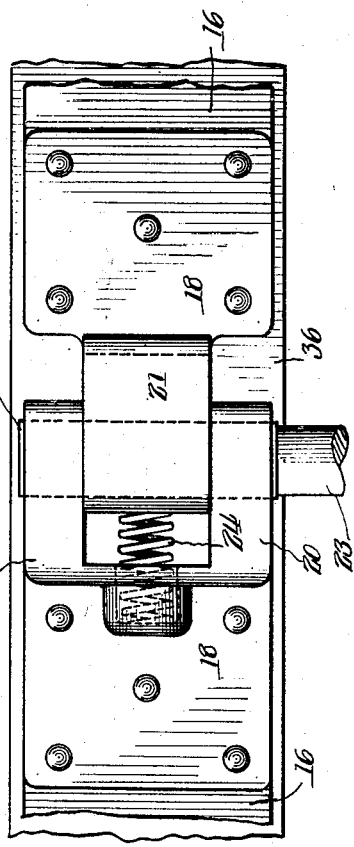

Patented June 30, 1931

1,812,683

UNITED STATES PATENT OFFICE

ADDI BENJAMIN CADMAN AND ALBERT C. WARNER, OF BELOIT, WISCONSIN, ASSIGNORS, BY MESNE ASSIGNMENTS, TO WARNER ELECTRIC BRAKE CORPORATION, OF SOUTH BELOIT, ILLINOIS, A CORPORATION OF ILLINOIS

MOMENTUM ACTUATED BRAKE

Application filed June 2, 1927. Serial No. 195,916.

Our invention relates to momentum actuated brakes and more particularly to a brake which is applied by tightening a flexible band around a rotating drum.

It is the principal object of the invention to provide a brake of the so-called band type having a new and improved means by which the kinetic energy of a revoluble member whose motion is to be arrested or controlled is utilized as a source of braking power, the application of the braking force to the band being controlled by electromagnetic action.

Another object is to provide an electrically controlled momentum brake of the band type in which the operated parts are arranged in a novel and compact manner so that the brake may be used on the front and rear wheels of automotive vehicles.

Other objects and advantages of the invention will become apparent from the following detailed description taken in connection with the accompanying drawings, in which:

Figure 1 is a fragmentary view in vertical section of a vehicle wheel and axle equipped with a brake embodying the present invention.

Fig. 2 is a fragmentary elevational view of the brake.

Fig. 3 is a sectional view taken along the line 3—3 of Fig. 1.

Fig. 4 is a plan view of the parts shown in Fig. 3.

Fig. 5 is a section along the line 5—5 of Fig. 2.

While we have shown in the drawings and will herein describe the preferred embodiment of the invention, it is to be understood that we do not intend to be limited thereby to the particular form disclosed but aim to cover all modifications and alternative constructions falling within the spirit and scope of the invention, as expressed in the appended claims.

In the exemplary embodiment of the invention shown in the drawings, our improved brake is applied to a wheel such as is commonly provided on automobiles, trucks, trailers and other similar vehicles. The wheel shown herein includes a series of spokes 10 secured between flanges 11 on a hub portion 12 which is rotatably mounted in the usual way on the outer end of a stationary axle 13. In case of drive wheels such as the rear wheels of automobiles the wheel would be fixed to the driving axle.

Mounted on the inside of the wheel so as to rotate therewith is a drum 14 which constitutes the revoluble member, the motion of which is to be arrested to check the motion of the vehicle. This drum has an inturned flange 15 securely bolted to the wheel and receiving the hub portion thereof. The non-rotatable gripping member of the brake comprises a flexible band 16 encircling the external peripheral surface 17 of the drum and arranged to be tightened about the drum. Owing to the enormous power available for braking, in the present instance, the band contacting with the periphery of the drum, may be made of metal having suitable friction and wear resisting properties instead of being lined with fabric or other non-metallic materials as is usually the case with brakes of this type.

The means for tightening the band around the drum and for holding the band against rotational movement during braking includes, in the present embodiment, a pair of straps 18 secured to the respective ends of the band 16 and a cam 19 adapted to be oscillated in either direction to draw the ends of the band together. Herein the straps are secured to the outer surface of the band by riveting. One of the straps is formed with a loop portion 20 which is bifurcated as shown in Fig. 4 so as to receive a corresponding loop portion 21 on the other strap in interfitting relation when the band is placed around the drum. The opposed end surfaces 22 of the loops cooperate to provide a square narrow recess extending parallel to the axis of the brake drum. Mounted in this opening and extending substantially the entire length thereof is the cam 19, which is preferably of rectangular cross section. This cam is rigid with a rock shaft 23 by means of which it may be oscillated in either direction to spread the surfaces 22 apart thereby enlarging the cam recess and drawing the ends of the band together to tighten it about the drum. A compression spring 24 acting between the opposed end portions of the loops 20 and 21 tends to move the ends of the band apart thereby maintaining the band in brake-releasing position. (Fig. 3.)

To enclose the open end of the brake drum and provide a mounting for the rock shaft 23, a stationary casing herein comprising a casting 25 circular in shape is provided having radial reinforcing ribs 26. The casing, in the present instance, has a hub 27 keyed to the axle 13. The shaft 23 is journaled intermediate its ends in a bearing lug 28 integrally formed on casting 25. Since the shaft is held against angular movement by the casing, it will be seen that the cam 19 serves to hold the band against rotational movement on the drum. Therefore, when the band is tightened about the drum the motion of the drum will be arrested.

Formed on the casting 25 opposite the lug 28 is a lug 29 which provides a rigid support for a pin 30 disposed outside of the band. A compression spring 31 acts between this pin and a strap 32 secured to the band to hold the lower portion of the band out of contact with the drum when the brake is released. The pin 30 also cooperates with the strap 32 to hold the brake band against rotation. Similar means not shown may be provided to hold the upper portion of the band out of contact with the drum when the brake is released.

The means by which the kinetic energy of the moving vehicle is utilized as a source of braking power comprises an electromagnet operatively connected to the rock shaft 23 and adapted when energized to attach itself frictionally to the rotating drum so as to move therewith to set the brake and then to slip relative to the drum while holding the brake in set position. To this end, an electromagnet having a rigid annular core 33 is employed, this core being mounted for rotary and slight axial movement on shoulders 34 formed on the inner side of the casting 25. When thus mounted, the flat machined surface 35 of the core is positioned opposite a flat annular surface of an inturned flange 36 on the brake drum providing an inwardly facing friction surface of narrow radial width and spaced a substantial distance from the drum axis. A magnetic coil 37 is disposed in an annular groove in the surface 35 of the core. When this coil is energized, the magnetic flux produced flows around the circuitous metallic path formed by the magnet core and armature, this attractive force acting in an axial direction to bring the opposed surfaces of the flange and the core firmly into frictional gripping engagement. The pressure between the friction surfaces is, of course, proportional to the number of turns in the coil and to the amount of current flowing therein. By providing an annular magnet mounted for axial movement toward and from the flat flange 36, the attractive force of the magnet is uniformly distributed and the pressure per unit area between the friction surfaces is relatively small. Thus, wear of the surfaces is reduced to a minimum.

The friction surfaces are enclosed by the peripheral portion of the casting 25 and an annular flange 38 formed integral with the casting. Such a closure is provided to exclude dust and dirt from the surfaces of the friction clutch.

To provide a powerful torque multiplying means by which the movement of the core 33 through a small fraction of one revolution while attached to the drum can be utilized for applying the brake, a crank arm 39 is fixed to the cam shaft 23 and is connected to the core 33. Preferably, the arm is mounted on the shaft 23 outside of the casing 25 so that a relatively long arm may be used and located in a position to give the desired leverage. Herein the arm extends outwardly from the periphery of the drum in a tangential direction and is connected at its free end to a link 40. The other end of the link is pivotally connected with a stud 41 rigid with the core 33 and projecting through an arcuate slot 42 in the casing in a direction parallel to the wheel axle. As shown more particularly in Fig. 5, an arcuate plate 43 may be carried by the core 33 and yieldingly held against the inner surface of the casing 25 by a spring 44, thereby closing the slot 42 but allowing the magnet to oscillate within the casing.

The electrical connections for the magnet coil may be of any preferred character. Thus, one end of the coil may be grounded on the metal core which it will be observed is in electrical contact with the vehicle frame structure. The other end of the coil may be connected to an insulated contact strip 45 within the casing. This strip may be engaged by a suitable insulated brush (not shown) which is normally urged toward the strip in a well known manner, the urging means thereby acting to maintain the core 33 in light mechanical contact with the armature flange 36, thereby maintaining a low reluctance of the magnetic circuit. The brush may be connected to a wire 46 leading to a source of electrical current. The source of current may be grounded to the vehicle frame through a suitable control rheostat for completing the energizing circuit for the magnet coil when it is desired to apply the brake.

When the drum is rotating, which will be the case whenever the vehicle is in motion, the brake may be applied by simply energizing the magnet. When energized, the magnet attracts the flange 36 thereby drawing itself against the flange at all points around its circumference with a force proportional to the current flowing in the core. The core thus becomes attached frictionally to the drum and rotates therewith, this movement being transferred through the crank arm 39 and the link 40 to oscillate the cam, thereby tightening the band about the drum. It will be apparent that the force for thus actuating the cam is derived from the kinetic energy of the moving vehicle and that the magnitude of this force is determined by the firmness with which the parts of the friction clutch are engaged, this in turn being determined by the strength of the magnetizing current which can be controlled readily.

The magnet core remains attached to the rotating drum only until the band has been tightened about the drum to such an extent that the reaction of the drum is equal to the braking force due to the frictional gripping engagement between the core and the drum which requires but a small fraction of one revolution of the drum. Then the core will slip relative to the drum flange, but will remain in brake setting position so long as the magnet remains energized. To release the brake, it is merely necessary to deenergize the magnet. When this occurs, the band is allowed to expand and is assisted in this movement by the spring 24, the magnet core and cam being thereby returned to brake releasing position, as shown in Fig. 3.

By utilizing the kinetic energy of the moving vehicle and by providing an operating connection having a large mechanical advantage, an enormous braking force can be exerted under the control of the magnet having relatively small number of turns and with a low energizing current such as is available on motor vehicles. With such a braking force, metal brake linings as distinguished from fabric linings may be used. Such a brake is extremely rugged in construction and powerful and efficient in its operation. Moreover, by providing an actuating means having a considerably greater range of movement than would be permissible in case of hand operated brakes, any slack resulting from wear of the parts will be taken up in each operation of the brake. Frequent adjustment of the operating parts is therefore avoided.

We claim as our invention:

1. The combination with a vehicle wheel, of a brake drum secured to the inner side of said wheel and having an external annular surface and an inturned flange at the inner edge of said surface, a flexible band encircling said surface, operating means associated with the ends of said band and adapted when actuated to tighten the band about said drum thereby controlling the motion of said wheel, a stationary support for said operating means, an annulus mounted on said support for movement axially of said member into frictional engagement with said flange, electromagnetic means to cause said engagement, and torque multiplying means connecting said ring and said operating means and adapted to transmit the movements of said ring to said operating means regardless of the direction of rotation of said wheel.

2. The combination with a vehicle wheel, of a brake drum secured to the inner side of said wheel and having an external annular surface a flexible braking member encircling said surface a stationary support enclosing the open end of said drum, a shaft journaled in said support and operatively associated with the ends of said braking member so as to tighten the braking member about said drum upon oscillation in either direction, means on said drum providing an annular friction surface substantially equal to the diameter of said drum and disposed in a plane substantially perpendicular to the drum axis, an element carried by said stationary support and adapted to attach itself frictionally to said surface by relative movement between the element and said surface in a direction axially of said drum, said element and said surface being enclosed by said support, electromagnetic means for causing said frictional attachment, and a mechanical connection between said element and said shaft including a crank arm disposed externally of the support.

3. A vehicle brake of the momentum type comprising, in combination, a drum which rotates during motion of a wheel to be braked, a contractible braking member disposed externally of the drum and having adjacent end portions, an annular magnetic element providing an inwardly facing friction surface disposed a substantial distance from and in a plane perpendicular to the drum axis and spaced axially from the closed end of the drum, a second magnetic element mounted opposite said first mentioned element for gripping engagement with said surface by a force of magnetic attraction acting axially of said elements, a winding on one of said elements adapted when energized to cause such attraction, and means connected to said second element and operable to contract said braking member about said drum in the angular movement of said second element through a small fraction of one revolution.

In testimony whereof we have hereunto affixed our signatures.

ADDI BENJAMIN CADMAN.
ALBERT C. WARNER.